United States Patent Office 3,542,763
Patented Nov. 24, 1970

3,542,763
AMYLOSE SOLUTIONS
Reedus R. Estes, Decatur, Ill., assignor to A. E. Staley Manufacturing Company, Decatur, Ill., a corporation of Delaware
No Drawing. Continuation of application Ser. No. 383,919, July 20, 1964, which is a continuation-in-part of application Ser. No. 212,467, July 25, 1962. This application Dec. 19, 1966, Ser. No. 603,051
Int. Cl. C08b 19/06
U.S. Cl. 260—233.3
14 Claims

ABSTRACT OF THE DISCLOSURE

Preparation of amylose ethers having a low level of salt contamination comprising reacting, optionally continuously, an aqueous solution of amylose with an etherifying agent in the presence of 0.01 to 0.25 mole of alkaline catalyst per mole of amylose, wherein the reaction is initiated at a temperature above the gelatin temperature of the aqueous alkaline amylose solution.

---

This application is a continuation of S.N. 383,919 filed July 20, 1964, now abandoned, which in turn is a continuation-in-part of S.N. 212,467 filed July 25, 1962, now abandoned.

This invention is concerned with the etherification of amylose in aqueous solution. More specifically this invention is concerned with the etherification of aqueous solutions of amylose whereby a relatively salt-free product is obtained.

It is well known that starch can be fractionated into two major fractions called amylose and amylopectin. Amylose is the straight chain portion of starch while amylopectin is the branched chain portion of starch. Various techniques have been developed to fractionate starch, and this invention is directed to the amylose fraction of starch.

It is known that on cooling, aqueous pastes of unmodified starch above about 3.5% solids concentration set up and form a rigid gel or lose the ability to flow freely. In the gel the phenomenon called "retrogradation" takes place. This involves the formation of a water-insoluble solid material which will not redisperse in water. This property of gelling is still more pronounced in pure amylose solutions. Even 1% pastes or solutions of amylose will gel and deposit practically the whole solute in the form of crystalline sediment in the course of a few days at room temperature. A 5% aqueous solution of amylose will gel on cooling to about 45° C.

Amylose has been derivatized to various degrees of substitution by reacting an aqueous suspension of amylose with an etherifying agent as described in Ser. No. 65,295, filed Oct. 27, 1960 now Pat. No. 3,127,392 and in Ser. No. 73,190, filed Dec. 3, 1960 now Pat. No. 3,208,998, and by reacting a solution of amylose with a derivatizing agent as described in British Pats. 869,192 and 871,634 primarily to prevent the retrogradation of amylose from aqueous solution. The suspension route has such advantages as (1) the amylose is already in a stable state ready to react, (2) the amylose derivative can be separated cheaply and efficiently from impurities, chiefly salts formed by neutralizing the alkaline catalyst, by physical means (filtration or centrifuging) but it suffers from the disadvantage that the products formed by this route are not homogeneous. This heterogeneity occurs because the majority of the derivatization takes place on the exposed surface of the suspended amylose. In extreme cases of heterogeneity, some amylose derivatives, most notably cyanoethyl amylose, prepared in suspension cannot be dissolved in water at any degree of substitution (D.S.), probably due to "case-hardening" as pointed out in Ser. No. 73,190 filed Dec. 2, 1960, now Pat. No. 3,208,998. Moreover, aqueous solutions of amylose derivatives prepared by the suspension route retrograde more readily (e.g., at a higher D.S. and/or at a lower total solids concentration) than corresponding products prepared in solution. Further, at a D.S. below about 0.9, the B.O.D. (biochemical oxygen demand) of products prepared in suspension is higher than the B.O.D. of comparable products prepared in solution. All of the aforementioned are due to the heterogeneity of products produced in suspension.

Although the derivatization of amylose in aqueous solution yields a more homogeneous product than the suspension route, the aqueous solution route presents all the problems encountered in the derivatization of aqueous starch pastes, but accentuated by the characteristics of amylose and additional problems peculiar to the use of amylose in films. As pointed out above, the major advantage of suspension processes over the aqueous solution processes (including paste processes) is that the suspended reaction product can be separated cheaply and efficiently from all water-soluble impurities in the reaction zone, most notably salts formed during the neutralization of the alkaline catalyst. On the other hand products produced by the derivatization of aqueous solutions (including starch pastes) require elaborate, time consuming salting out techniques, such as those described in United States Pat. 2,588,463 to Balassa and British Pat. 869,192, dialysis, aqueous alcohol washes, etc., in order to produce salt free products. British Pat. 869,192 indicates that salting out techniques for isolating pure amylose ethers having a D.S. above 0.20 and aqueous alcohol washes of amylose ethers having a D.S. even below 0.20 are both impractical due to the solubility of the amylose derivative in the purification medium. In other words amylose ethers having a D.S. above 0.20 are too water-soluble in aqueous salt solution and all amylose ethers are too water-soluble in aqueous alcohol to be isolated from salt or other impurities. Inasmuch as the amylose derivatives of this invention find their greatest use in films, where the presence of even small quantities of salt lower the tensile strength of the film, lower the elongation of the film and lower the clarity of the film, it is necessary to produce products having as little salt contamination as economically possible.

In addition to this salt contamination problem, the derivatization of amylose in aqueous solution is complicated by the high temperature at which amylose dissolves and the tendency of amylose to retrograde from its aqueous solution on cooling. Unlike starch, which disperses rapidly in water upon heating to 70° C. to 100° C. at a neutral pH, such cooking in water at a neutral pH will not dissolve amylose. Amylose can be dissolved in water at a neutral pH by autoclaving at temperatures in excess of 125° C. However, as pointed out above, this solution is quite unstable in the sense that it forms a solid gel and retrogrades on cooling. Further, the higher the concentration of amylose the higher the temperature at which amylose retrogrades. British Pat. 871,634 considers this method of forming an amylose solution to be of limited usefulness. Although this retrogradation problem can be overcome by using an organic solvent such as dimethyl sulfoxide instead of water, the higher cost of the organic solvent makes its use impractical.

While we are aware that the derivatizations of amylose can be carried out efficiently in aqueous suspension using a relatively low concentration of alkaline catalyst, thereby minimizing subsequent salt formation (see Ser. No. 65,295 filed Oct. 27, 1960, now Pat. No. 3,127,392 and Ser. No. 73,190 filed Dec. 2, 1960, now Pat. No. 3,208,-

998) until this invention aqueous solutions of amylose have been derivatized using a high concentration of alkaline catalyst (see British Pats. 869,192 and 871,634), and this results in the formation of a high concentration of salt when the alkali is neutralized. Concentrated alkali is required in those processes in order (1) to dissolve amylose in water at ambient temperatures and (2) to form a stable aqueous system from which the amylose will not retrograde. It has been determined that the weight percent of sodium hydroxide (based on solution weight) necessary to form a stable aqueous solution is equal to 0.5+0.18 times the weight percent of amylose in the solution to be formed. For example, it takes at least 3.2 grams of NaOH (0.08 mole) to form a stable aqueous solution of amylose containing 0.1 mole of amylose at a concentration of 16% amylose by weight. Accordingly, it can be seen that it requires a considerable amount of alkali to form a stable aqueous solution and correspondingly there is a considerable concentration of salt in the final product. It might be noted that hydroxyethyl amylose films having as little as 0.4 mole of residual salt per mole of amylose form opaque films. Apparently the amylose is a binder for crystalline salt. At a level of about 0.25 mole of salt per mole of amylose, there is the first indication of the presence of very fine salt crystals in amylose film. Further, bases, such as calcium hydroxide or barium hydroxide which have limited solubility in water cannot be used in these aqueous solution processes, since it is not possible to establish a sufficiently alkaline medium to dissolve amylose at ambient temperatures. This is a decided drawback since calcium and barium ions can be removed from aqueous systems by precipitation with a neutralizing acid such as sulfuric acid or even with carbon dioxide.

In addition to the undesirability of having such a high concentration of salt in the final reaction product, it is undesirable to use high concentrations of alkali in many derivatization reactions. For example, acrylonitrile may hydrolyze to acrylamide or to the acrylic acid salt within reaction medium when the alkali concentration is sufficiently high. Further, the cyaneothyl group of cyanoethyl amylose may be partially or completely converted to carbamylethyl or the carboxyethyl salt; in addition alkali tends to hydrolyze the ether bonds, actually deetherifying the derivative. Other reactions such as the acetylation of amylose with vinyl acetate or acetic anhydride will not take place at all or if they do take place the ester group is immediately saponified off at the pH necessary to dissolve amylose in concentrated base. Further, when a high concentration of alkali is employed to dissolve amylose and to catalyze the etherification thereof, the alkali, even under an inert atmosphere, degrades the amylose. In other words the molecular weight of the amylose is decreased considerably by high concentrations of alkali even at low temperatures.

The general object of this invention is to provide a practical process of preparing homogeneous, non-retrograding amylose derivatives in aqueous solution having all the advantages associated with aqueous solution processes most particularly, product advantages inherent in solution processes, and having a minimum of the disadvantages associated with aqueous solution processes, namely, high catalyst concentrations which results in high levels of salt contamination necessitating expensive desalting techniques and undesirable side reactions.

Broadly, this invention comprises a process of preparing amylose ethers having a low level of salt contamination, which comprises reacting an aqueous solution of amylose, wherein said aqueous solution of amylose consists essentially of from about 2 to 30 parts by weight amylose and from 98 to 70 parts by weight water, with an etherifying agent in the presence of from 0.01 to 0.25 mole of an alkaline catalyst per mole of amylose.

The specific steps and modifications of this process will become clear as the description proceeds.

REACTANTS

The amylose used in this invention may be prepared from any native starch or modified native starch or comprise whole starch which is composed of at least 50% amylose. It is immaterial for the purpose of this invention whether the amylose fraction is from corn starch, potato starch, wheat starch, rice starch, tapioca starch, sago starch, etc. The modified starches include hypochlorite-oxidized starch, enzyme-treated starch, acid-hydrolyzed starch, etc. Suitable sources of whole starch include "Amylomaize" or "Amylon" (high-amylose corn starch containing approximately 54% amylose), and "Amylon VII" (high-amylose corn starch containing up to 70% amylose).

The amylose comprises from about 2% to 30% by weight of the water and amylose. While it is desirable, from an economic point of view, to operate with as high a concentration of amylose as possible, the amylose concentration employed is dependent upon the temperature at which the reaction is initiated and the catalyst concentration to a lesser extent. The higher the concentration of amylose, the more readily the aqueous solution retrogrades or gels. In other words, as the concentration of amylose in aqueous solution increases the temperature at which the aqueous solution gels increases. In the October 1958, Cereal Science Today, vol. 3, No. 8, pages 206-209, the author has a graph of the concentration of potato amylose which had been dissolved in water at a temperature in excess of 130° C., vs. the gelation temperature of the amylose solution. This graph indicates that (1) a 25% by weight aqueous solution gels at a temperature in excess of 100° C., (2) a 20% by weight aqueous solution gels at 88° C., (3) a 15% weight aqueous solution gets at 72° C., (4) a 10% by weight aqueous solution gels at 60° C., and (5) a 5% by weight aqueous solution gels at 45° C.

Any of the etherifying agents previously used to modify polysaccharides, such as starches or cellulose, may be used in this invention, under the conditions set forth hereafter. These etherifying agents, which can be classified into five main categories, include alkylene oxides such as ethylene oxide, propylene oxide, 1, 2-butylene oxide, 2, 3-butylene oxide and styrene oxide; alpha, beta-ethylenically unsaturated Michael's addition reagents such as acrylonitrile, acrylamide, ethyl acrylate, and vinyl sulfones; lactones such as beta-propiolactone and propane sultone; alkyl halides, such as methyl chloride, chloroacetic acid (or its soluble salts), ethylene chlorohydrin and benzyl chloride, and the corresponding bromo and iodo compounds; and dialkyl sulfates such as dimenthyl sulfate and diethyl sulfate. Various other compounds such as ethylene imine and ethylene sulfide may also be used.

The alkylene oxides, which may be characterized as vicinal epoxy compounds, and acrylonitrile are the preferred etherifying agents of this invention because they (1) react readily with aqueous solutions of amylose at extremely low catalyst concentrations (0.04 mole of catalyst per mole amylose is ideal at 7.5-20% by weight of amylose) (2) do not form ionic by-products in any significant amount which neutralize the alkaline catalyst and (3) are quite inexpensive. In general, the various other alpha, beta-ethylenically unsaturated Michael's addition reagents, particularly acrylamide, which like the various other members of this class are more expensive and more prone to form ionic by-products than acrylonitrile, are considered quite useful. While the lactones form a relatively high concentration of ionic groups in their reactions with amylose, this is not considered to be a drawback since this class of reagents reacts with amylose at an acidic as well as a basic pH and the reaction is readily initiated with alkali.

In contrast to the first three classes of etherifying agents discussed above, the alkyl halides and alkyl sulfates are of limited utility since the concentration of alkali in the reaction vessel determines the maximum degree of substitution of the amylose ether. In the case of these reagents, a halide ion or a monoalkyl sulfate ion is liberated by each molecule of reagent that reacts with amylose, Since halide ions and monoalkyl sulfate ions are quite acidic, either will neutralize the catalyst. Accordingly, the maximum D.S. of the amylose derivative is determined by the molar concentration of the catalyst. For example, acrylonitrile can be reacted with amylose in the presence of 0.04 mole of sodium hydroxide per mole of amylose to a D.S. of 0.9 or higher. On the other hand, everything else being equal, the maximum D.S. that can theoretically be obtained using dimethyl sulfate or an alkyl halide is 0.04. Accordingly, these two classes of reagents can only be used in the process of this invention where a low D.S. (below about 0.2) is desired.

The various etherifying agents of this invention can be employed in virtually any proportion. In general, the etherifying agent can comprise from less than 0.1 mole of etherifying agent per mole of amylose to more than 8 moles of etherifying agent per mole of amylose. The amount of etherifying agent used is dependent upon the efficiency of the reagent and the D.S. of the amylose derivative desired. This will be explained in the examples in greater detail.

The alkaline catalyst for this reaction may be any water-soluble alkaline material. The catalyst may be an alkali metal hydroxide, such as sodium hydroxide and potassium hydroxide; an alkaline earth metal hydroxide, such as calcium hydroxide and barium hydroxide; a tetraalkyl ammonium hydroxide, such as tetramethyl ammonium hydroxide; a tetraalkyl phosphonium hydroxide, such as tetraethyl phosphonium hydroxide, pyridine, etc.

As pointed out above, the catalyst concentration lies within the range of 0.01 to 0.25 mole per mole of amylose. However, the ideal catalyst concentration is dependent upon such factors as the etherifying agent, the catalyst, the concentration of amylose in the reaction mixture, and the temperature at which the reaction is initiated. These factors also affect the uniformity of the amylose ether. For example, it has been found that in the reaction of ethylene oxide with amylose using a sodium hydroxide catalyst, the ratio of moles of catalyst per mole of amylose necessary to form a uniform product drops as the concentration of amylose (weight percent) in the system increases and/or as the temperature at which the etherification reaction is initiated increases. With a 5% by weight solution of amylose best results have been obtained at an 80° C. reaction temperature using 0.16 mole of NaOH per mole of amylose. Other things being equal when amylose comprises about 7.5–20% by weight, best results have been obtained using 0.04 mole of NaOH per mole of amylose. By increasing the temperature at which the reaction is initiated to 95° C., a 5% by weight aqueous amylose solution will give a uniform product at 0.04 mole of catalyst per mole of amylose. On the other hand, the etherification of amylose with acrylonitrile at 80° C. using a sodium hydroxide catalyst yields a uniform product at 0.04 mole NaOH per mole of amylose independently of the amylose concentration. In general, the first three classes of etherifying agents rarely require more than 0.20 mole of catalyst per mole of amylose. At practical levels of amylose concentration (7.5–20%), we prefer to employ from about 0.2 to 0.10 mole of catalyst per mole of amylose.

While a catalyst concentration as low as 0.01 mole per mole of amylose may be employed with many of the preferred etherifying agents, it is usually preferable to use catalyst concentrations in the range of 0.04 to 0.08 mole of catalyst per mole of amylose. While it is desirable to use as low a concentration as possible, under the conditions of the etherification reaction, oxygen present in the reaction vessel appears to oxidize the amylose and the resultant carboxyl groups of the oxidized amylose appear to neutralize the catalyst with the attendant curtailment of the reaction. Accordingly, when the catalyst concentration is very low, e.g., approximately 0.01 mole per mole of amylose, it is usually necessary to run the reaction in the absence of oxygen, e.g., in an inert gas atmosphere, to avoid neutralizing the catalyst.

In addition to the foregoing, such oxidation of amylose, which is catalyzed by alkali, discolors and degrades the product to an extent dependent upon the amount of oxygen and alkali present in the reaction vessel. Accordingly, it is usually preferably to keep the oxygen concentration within the reaction vessel at a minimum in view of the aforementioned possibility of discoloration. However, even in those cases where an inert atmosphere is employed, degradation and discoloration are distinct possibilities due to the cleavage of glycosidic bonds by alkali at oxidized centers already existing along the amylose chain. Such degradation is directly proportional to the concention of the alkaline catalyst and is particularly noticeable with the high concentration of alkali used by the prior art.

Any mineral acid may be used to neutralize the catalyst. It is usually preferably to use strong acids, such as hydrochloric acid, sulfuric acid, benzenesulfonic acid and phosphoric acid. However, acetic acid has been quite effective. Likewise $CO_2$, which forms carbonic acid in water, can be used. While most of these acids form water-soluble salts when neutralizing the aforementioned alkaline catalysts, sulfuric acid and carbon dioxide neutralize barium hydroxide or calcium hydroxide forming water insoluble salts.

PROCESS

In somewhat greater detail this invention comprises a process of preparing amylose ethers having a low level of salt contamination, which comprises the steps of providing an aqueous solution of amylose consisting essentially of from about 2 to 30 parts by weight amylose and from about 98 to 70 parts by weight water and reacting said amylose with an etherifying agent in the presence of from 0.01 to 0.25 mole of alkaline catalyst per mole of amylose.

A convenient method for preparing the amylose solution comprises forming an aqueous suspension of amylose and then dissolving the amylose at a temperature in excess of 125° C. Prior to dissolution the aqueous amyloselose suspension is preferably adjusted to essential neutral pH with a suitable base, such as one of the aforementioned alkaline catalysts, or with a suitable acid, such as one of the aforementioned neutralizing acids, in order to minimize degradation or other chemical change during the formation of the aqueous solution. At acidic pH hydrolysis occurs by random cleavage of glycosidic bonds, which results in rapid decrease in viscosity. The viscosity of the polymeric solution is indicative of molecular weight. Under alkaline conditions, the degradation is predominately stepwise and the decrease in viscosity is less rapid. However, cleavage of glycosidic bonds will also occur at oxidized centers along the amylose chain, if present as explained previously.

The aqueous amylose suspension is then heated to a tempearture in excess of about 125° C. (up to about 200° C.) in order to dissolve the amylose. While the amylose can be dissolved by using any convenient sealed vessel, (autoclave), it is preferably to employ a continuous cooker, such as a jet cooker of the type described in application Ser. No. 790,487, filed Feb. 2, 1959 now Pat. No. 3,101,284, or a Votator. In a continuous cooker of the above type the amylose is subjected to a high temperature for a short time (1 second to 15 minutes) and thereby degradation of the amylose is minimized. When using a jet cooker of the type described in application Ser. No. 790,487 filed Feb. 2, 1959, now Pat. No. 3,101,284, the concentration of amylose in solution is generally lower than the concentration of the amylose in the suspension. For example, a 10% suspension dissolved in this apparatus results in approximately 7.5–8.5% by weight total solids solution. This dilution is caused by the condensation of steam in the solution.

After the suspended amylose is dissolved in the aqueous medium, a reaction is initiated between the etherifying agent and the dissolved amylose in the presence of 0.01 to 0.25 mole of alkaline catalyst per mole of amylose while maintaining said amylose in solution at a temperature of from about 35° C. to the dissolution temperature of said amylose, wherein said minimum temperature varies directly with the concentration of amylose in solution. While the reaction can be initiated by adding any alkaline catalyst to an aqueous solution of amylose containing the etherifying agent, it is preferable to edd the etherifying agent to an aqueous alkaline solution of amylose due to the volatility of some etherifying agents, such as ethylene oxide, and the stabilizing effect against retrogradation and gelatin of even small quantities of alkali at higher temperatures. In those cases where degradation of amylose is desired or unimportant, the alkaline catalyst may be added to the aqueous suspension of amylose prior to the dissolution of amylose in water. The therification reaction may be run in an open vessel or in a closed vessel. When an open vessel is employed, allowance should bemade for any loss of volatile etherifying agent.

As pointed out above the gelation temperature of an aqueous solution of amylose varies directly with the total solids concentration of amylose in solution. Accordingly, the minimum temperature at which any etherification reaction can be initiated without the amylose retrograding or gelling varies directly with the total solids concentration of the aqueous amylose solution.

Once the reaction is limited, the etherification proceeds rapidly, particularly with the first three classes of etherifying agents, and the reaction temperature can be permitted to fall to room temperature, if desired, without the amylose retrograding or gelling. The rapid rate of etherification make it quite attractive to use a continuous process. As a practical matter, we prefer to initiate the reaction 7.5% by weight amylose solutions at temperatures above about 55° C., using 0.04 mole of base per mole of amylose. Generally, it has been found that about 70° C.-95° C. is suitable for concentrations up to about 20% by weight amylose using 0.04 mole of base per mole of amylose. Higher temperatures may be employed to initiate the reaction, and desirably so in cases where the amylose concentration is high.

The resultant aqueous amylose ether solution can be partitioned (filtered or centrifuged) hot or cold, if desired, to remove any insoluble material, such as water-insoluble impurities in the starting amylose or insoluble salts resulting from the neutralization of barium hydroxide or calcium hydroxide with sulfuric acid or carbon dioxide. However, whether partitioned or not, the amylose ether can be recovered from solution by precipitation with an organic material, such as acetone or a lower alkanol by evaporating the water on hot rolls or in a spray dryer or even by casting the ether directly into a film and drying.

A particularly economical and desirable method of preparing essentially pure products entails dewatering the neutralized amylose ether at desirably from about 7.5–25% total solids by roll drying, grinding the friable product and extracting the ground product with an organic solvent such as an alcohol or ketone. Generally, the hot rolls are maintained at about 130° C. to about 160° C., however, if the amylose ether tends to soften at these temperatures, the hot rolls are maintained below the softening temperature of the amylose ethers. Roll drying has the advantage that there is essentially no limitation on the total solids of the aqueous amylose solution. On the other hand the high viscosity of the aqueous amylose solution limits spray drying to about 10% maximum total solids. Further, the drying rate of spray dried amylose ethers is considerably slower than the drying rate where hot rolls are employed.

After the dewatered product is ground, organic impurities such as byproducts of etherification (polyalkylene glycols; beta, beta'-oxydipropionitrile, etc.) can be removed by extracting with alcohol (methanol, ethanol, etc.) or ketone (acetone, methyl ethyl ketone, etc.), without the loss of any significant amount of the amylose ethers. The resultant products are essentially pure and can be used in various types of films. The particular organic solvent employed in the organic solvent wash is dependent upon the amylose derivative. For example, methanol extraction has the advantage that it also removes salt from the product. Due to the low level of catalyst used in the process of this invention, the methanol extracted product has essentially no salt contamination. However, methanol tends to make cyanoethyl amylose having a D.S. above about 0.3 somewhat gummy. Since the organic solvent is employed to extract impurities from the solid product rather than to precipitate the amylose ether from aqueous solution, the concentrated organic solvent can be recovered with little or no trouble by distillation and reused. If desired, the organic impurities can be left in the amylose ether in which case they serve to plasticize the amylose ether.

The following examples are illustrative and should not be construed as limiting the scope of this invention.

Example I

A 12% aqueous slurry of 368 grams (360 grams dry solid basis) of corn amylose (reduced viscosity 1.79) in 2,614 ml. of water was put through a 3 liter jet cooker. The structure and operation of the jet cooker are discussed in detail in application Ser. No. 790,487, filed Feb. 2, 1959, now Pat No. 3,101,284. After a hold time of 120 seconds, a slightly cloudy solution (3,225 grams) was collected in a preheated Dewar flask. Three thousand and sixty grams of the hot solution (330 grams, 2.04 moles) of amylose was poured into a preheated 5 liter flask and stirring started under a flowing nitrogen blanket. After the temperature was adjusted to 81° C., 33.4 ml. of a 0.1 gram per ml. of aqueous sodium hydroxide (0.04 mole per mole of amylose) was added. Then 136 ml. (109 grams, 3.06 moles) of acrylonitrile was added over 28 minutes to the reaction vessel while maintaining the vessel at 81° C. The temperature of the reaction was then allowed to fall and stirring was continued for 22 hours. Four 50 ml. samples were taken from the reaction vessel after 2 minutes, 1 hour, 3 hours, and 5 hours, respectively. Each of these samples and the final reaction product were neutralized to a pH of 6.5 with hydrochloric acid. The first four samples and 50 ml. of the final product were each poured into 500 ml. of methanol and the resultant precipitate was dried for sixteen hours at 60° C. in a vacuum oven. The samples were then analyzed for nitrogen. The results are set forth below in Table I.

TABLE I

| Sample No.: | Reaction time | D.S. |
|---|---|---|
| 1 | 2 minutes | 0.38 |
| 2 | 1 hour | 0.48 |
| 3 | 3 hours | 0.52 |
| 4 | 5 hours | 0.54 |
| 5 | 22 hours | 0.57 |

The reaction between acrylonitrile and amylose using 0.04 mole of sodium hydroxide per mole of amylose is quite rapid. Further, it can be seen that the reaction is essentially complete in a very short time after the reaction is initiated.

The acrylonitrile used in this example can be replaced with acrylamide with essentially the same result.

Example II

This example illustrates the prepaartion of an amylose ether using the alkali concentration normally used in the derivatization of amylose. The example in British Pat. No. 869,192 was repeated using acrylonitrile as the etherifying agent instead of ethylene oxide. Four hundred and eight ml. of water and 17 grams of sodium hydroxide were placed in a 1 liter 3 necked flask equipped with condenser, thermometer, stirrer, addition funnel, and nitrogen inlet. After the reaction vessel was purged with nitrogen, 88.0 grams (82 grams dry solid basis) of corn amylose (reduced viscosity 1.79) was added at a temperature of 26° C. After the amylose was dissolved, 29.2 ml. (23.3 grams, 0.44 mole) of acrylonitrile was added over a 5 minute period. Temperature was maintained at 24° C. Twenty-five ml. samples of reaction product were removed from the reaction vessel at 1 hour, 3 hour, and 5 hour intervals. These samples and the main reaction product were neutralized with 1 normal hydrochloric acid to a pH of 6.5. The samples were isolated in the same manner as Example I. The results are set forth below.

TABLE II

| Sample No.: | Reaction time | D.S. |
|---|---|---|
| 1 | 1 hour | 0.62 |
| 2 | 3 hours | 0.62 |
| 3 | 5 hours | 0.63 |
| 4 | 21 hours | 0.60 |

Viscosity in centipoises at 25° C. for the cyanoethyl amylose derivatives prepared by the method of Example I and by the method of Example II was determined from a graph of the percent total solids versus Brookfield RVT viscosity (Spindle #1, 10 r.p.m.). The results are set forth below in Table III.

TABLE III

| Example No.: | Solution percent total solids | Viscosity, centipoises at 25° C. |
|---|---|---|
| I | 10.0 | 175 |
| II | 10.0 | 73 |
| I | 7.5 | 74 |
| II | 7.5 | 36 |
| I | 5.0 | 31 |
| II | 5.0 | 19 |

The above data indicates that cyanoethyl amylose derivatives prepared by the method of Example II using a high concentration of alkaline catalyst results in a highly degraded cyanoethyl amylose. In almost all cases the viscosity of the cyanoethyl amylose derivatives of the same D.S. and at the same total solids concentartion prepared by the method of Example I is twice as high as the viscosity of the cyanoethyl amylose derivative prepared by the mehod of Example II.

Example III

A10% aqueous slurry of 110 grams (100 grams dry solid basis) of corn amylose in 890 ml. of water was put through a 3 liter jet cooker as described in Example I. Twelve hundred and forty-five grams (7.5% total solids) of corn amylose from the jet cooker (93.5 grams, 0.577 mole of amylose) was poured into a preheated two liter reaction flask and stirring started under a flowing nitrogen blanket. Nine and one-tenth ml. of 0.1 gram per ml. aqueous sodium hydroxide (0.04 mole of sodium hydroxide per mole of amylose) was added. The temperature of the vessel was allowed to drop from 80° to 55° C. over a 32 minute period. Then 32.5 ml. (26.0 grams, 0.490 mole) of acrylonitrile was added over a 5 minute period while maintaining the reaction temperature at 55° C. The temperature was held at 54 to 56° C. for 1 hour then allowed to drop. The sample was adjusted to a pH of 6.3 with 5 normal hydrochloric acid. The reaction product was considerably more cloudy than the product of Example I indicating that the reaction should be initiated at a temperature above 55° C. when 7.5% by weight total solids of amylose is to be reacted in aqueous solution. The cyanoethyl amylose product had a D.S. of 0.41 as did another run which was initiated at a temperature of 80° C.

Example IV

A series of cyanoethyl amylose preparation was made by the method of Example I using amylose of various reduced viscosities. Each of the final reaction products was drum dried and the drum-dried material was then extracted wtih methanol to extract by-products of the reaction. The methanol was recovered by distillation. The residue from the distillation was free of amylose and amylose ethers. The results are set below in Table IV.

TABLE IV

| Reduced viscosity of amylose | Moles of sodium hydroxide per mole of amylose | Moles of acrylonitrile reacted per mole of amylose | Degree of substitution in the final product |
|---|---|---|---|
| 0.855 | 0.04 | 0.493 | 0.27 |
| 0.855 | 0.04 | 0.995 | 0.53 |
| 0.855 | 0.04 | 1.80 | 0.89 |
| 1.28 | 0.04 | 0.495 | 0.30 |
| 1.28 | 0.04 | 0.98 | 0.60 |
| 1.28 | 0.04 | 1.81 | 0.94 |
| 1.79 | 0.04 | 0.493 | 0.30 |
| 1.79 | 0.04 | 1.01 | 0.57 |
| 1.79 | 0.04 | 1.75 | 0.92 |

The above data indicates that it is possible to regulate the degree of substitution of cyanoethyl amylose derivatives by regulating the amount of acrylonitrile reacted with the amylose. The degree of substitution is independent of the reduced viscosity of the amylose. As shown in the table when about one-half mole of acrylonitrile per mole of amylose is employed to cyanoethylate amylose, the product has a D.S. of 0.27 to 0.30; when about one mole of acrylonitrile per mole of amylose is employed, the D.S. is 0.53 to 0.60 and when about one end three-quarter moles of acrylonitrile is used per mole of amylose, the D.S. is 0.89 to 0.94. As a practical matter a D.S. of 0.95 or 0.96 is the highest D.S. that a cyanoethyl amylose preparation may have and be water soluble. At a D.S. above about 0.96 the cyanoethyl amylose tends to precipitate out of an aqueous alkaline reaction mixture unless hydrolyzed by alkali. The product will not subsequently redisperse in water on heating even to a 150° C. In other words at a D.S. of above 0.95, the cyanoethyl amylose loses its water solubility.

Example V

Example I was repeated except that the sodium hydroxide was replaced by either potassium hydroxide, calcium hydroxide, or barium hydroxide. When calcium hydroxide was employed, the catalyst was neutralized by bubbling carbon dioxide into the reaction vessel. The calcium carbonate that precipitated from the reaction vessel was removed by filtration. When barium hydroxide was employed as the catalyst, it was neutralized with sulfuric acid. The water insoluble barium sulfate was removed by pressure-filtration. Results are set forth below in Table V.

TABLE V

| Catalyst | Moles of catalyst per mole of amylose | Moles of acrylonitrile per mole of amylose | Degree of substitution |
|---|---|---|---|
| KOH | 0.045 | 1.12 | 0.59 |
| Ca(OH)$_2$ | 0.04 | 0.98 | 0.49 |
| Ba(OH)$_2$ | 0.04 | 0.945 | 0.48 |

Example VI

A series of hydroxy ethyl amylose derivatives were prepared in the following manner. A slurry of amylose (adjusted to pH 7) was solubilized in the jet cooker in the manner described in Example I. The sample was poured into a heated autoclave (immersed in a bath at a temperature of about 70° C. to 110° C.). Nitrogen gas was bubbled through the inlet tube to provide agitation and an inert atmosphere during the addition of sodium hydroxide catalyst. The autoclave was then closed and ethylene oxide added as rapidly as possible. After one hour the solution was cooled and neutralized to pH 7 with 5 N hydrochloric acid. The amylose ether in a 200 ml. portion of the product was precipitated by slow addition to 2 liters of acetone in a Waring Blendor (low speed, 60–70 volts). The precipitate was twice milled in a blendor with fresh acetone and dried 16 hours in a vacuum over at 70° C. The main portion of solution was pressure-filtered through an asbestos pad. Results appear below in Table VI.

TABLE VI

| Amylose | | | Moles ethlyene oxide | Moles NaOH per mole of amylose | Temperature at which reaction was initiated, % C. | Hours reacted | M.S. of product |
| --- | --- | --- | --- | --- | --- | --- | --- |
| Percent T.S. in C. | Moles | Percent T.S. in A. | | | | | |
| 5.0 | 0.92 | 4.3 | 0.28 | 0.17 | 85 | 1 | 0.09 |
| 10.0 | 1.86 | 9.3 | 0.40 | 0.16 | 85 | 1 | 0.10 |
| 15.0 | 2.76 | 13.0 | 0.82 | 0.04 | 85 | 1 | 0.16 |
| 15.0 | 2.76 | 13.4 | 1.70 | 0.04 | 85 | 1 | 0.27 |
| 20.0 | 2.74 | 17.2 | 1.73 | 0.04 | 85 | 1 | 0.41 |
| 13.0 | 2.55 | 11.1 | 4.29 | 0.16 | 110 | 1 | 0.60 |
| 10.0 | 1.76 | 8.7 | 4.64 | 0.16 | 85 | 1 | 1.00 |
| 10.0 | 0.35 | 8.1 | 1.34 | 0.08 | 95 | 2 | 1.21 |
| 10.0 | 0.42 | 8.1 | 1.34 | 0.16 | 70 | 5 | 1.43 |
| 12.0 | 2.1 | 10.6 | 31.0 | 0.16 | 85 | 3 | 2.9 |

In Table VI, (1) percent T.S. in C. stands for percent by weight of amylose charged to the jet cooker, (2) percent T.S. in A. stands for percent by weight of amylose reacted in autoclave, and (3) M.S. stands for the average number of moles of alkylene oxide substituted on each mole of amylose.

The above table indicates that it is possible to prepare hydroxyalkyl amylose having an M.S. of from about 0.09 to 2.9 rapidly using low levels of catalysts (0.04 to 0.17 mole of catalyst per mole of amylose) at temperatures ranging from about 70° C. to 110° C. using solubilized aqueous slurries of from about 5% to 20% by weight amylose.

A number of the above samples having a low M.S. were dissolved at 10% solids in water at the lowest temperature possible and the resultant solution cooled in order to find the gelation temperature of the solution. The results are set forth below in Table VII.

TABLE VII

| | Temperature of dissolution, ° C. | Temperature of gelation, ° C. |
| --- | --- | --- |
| M.S. of amylose: | | |
| 0.09 | 65 | 60 |
| 0.10 | 50 | 45 |
| 0.15 | 40 | 35 |
| 0.20 | 25 | (¹) |

¹ Does not gel at room temperature.

The above table indicates that the gelation temperature and dissolution temperature of amylose in water can be closely controlled by regulating the M.S. of the sample. In general, the higher the M.S. the lower the dissolution temperature and the lower the gelation temperature of hydroxyalkyl amylose.

Films were cast in 2″ diameter aluminum dishes from hydroxyethyl amylose derivatives having an M.S. of 0.09 to 1.0 using (A) the neutralized filtered solution and (B) ten percent aqueous solution of the acetone precipitated product. The acetone precipitated samples had a higher tensile strength of comparable M.S., indicating that the glycols formed during the hydroxyalkylation reaction placticize the amylose films.

Example VII

The process described in Example VI was repeated using propylene oxide instead of ethylene oxide. The results are set forth below in Table VIII.

TABLE VIII

| Amylose | | | Moles Propylene oxide | Moles NaOH per mole of amylose | Temperature at which reaction was initiated, ° C. | Hours reached | M.S. of product |
| --- | --- | --- | --- | --- | --- | --- | --- |
| Percent T.S. in C. | Moles | Percent T.S. in A. | | | | | |
| 13.0 | 2.40 | 7.7 | 0.26 | 0.19 | 85 | 1 | 0.03 |
| 15.0 | 2.76 | 13.2 | 0.52 | 0.08 | 85 | 1 | 0.05 |
| 13.4 | 2.40 | 11.1 | 0.73 | 0.16 | 85 | 1 | 0.10 |
| 13.0 | 2.40 | 11.5 | ¹ 1.56 | 0.16 | 85 | 1 | 0.15 |
| 13.0 | 2.40 | 10.4 | 1.51 | 0.16 | 85 | 1 | 0.17 |
| 13.0 | 2.40 | 11.4 | 2.40 | 0.16 | 85 | 1 | 0.40 |
| 13.0 | 2.40 | 11.6 | 4.61 | 0.16 | 85 | 1½ | 0.50 |
| 13.0 | 2.40 | 11.2 | 6.0 | 0.16 | 85 | 2 | 0.65 |

¹ Butylene oxide was used instead of propylene oxide.

The hydroxypropyl amylose samples were cast into films. The first three samples (those having an M.S. of 0.03, 0.05 and 0.10) were not water-soluble at room temperature while the last four samples were water soluble at room temperature.

A five percent aqueous suspension of 0.1 M.S. hydroxypropyl amylose dissolved at 46° C. and gelled on cooling to 41° C. while a 10% aqueous suspension of 0.05 M.S. hydroxypropyl amylose dissolved at 60° C. and gelled at 55° C. The above indicates that hydroxypropyl amylose ethers of low M.S. were more water-soluble than hydroxyethyl amylose ethers of the same M.S.

The water solubility of hydroxyalkyl amylose films was compared by dissolving films in water at room temperature. A hydroxybutyl amylose film of 0.15 M.S. dissolved in 15 seconds, a hydroxypropyl amylose film of 0.5 M.S. dissolved in 90 seconds and a hydroxyethyl amylose film of 0.5 M.S. dissolved in 150 seconds. The above data indicate that as the chain length of a hydroxyalkyl group of hydroxyalkyl amylose increases from ethyl to butyl the water solubility of the amylose ether increases.

Example VIII

The technique described in Example VI was repeated using styrene oxide instead of ethylene oxide. A 13% aqueous slurry of amylose was dissolved in the jet cooker and 2.4 moles of amylose (11.1% total solids) was reacted with 0.65 mole of styrene oxide in the presence of sodium hydroxide (0.16 mole sodium hydroxide per mole of amylose) at 85° C. for 2 hours. On neutralization with HCl the product, having an M.S. of 0.27, precipitated as a fine powder from the reaction vessel. The purified washed product was insoluble in cold water, benzene, chloroform, hexane, acetone, methanol, ethanol and isopropanol. It was soluble in hot water and precipitated as a fine powder from the aqueous solution on cooling (no gel was formed).

Example IX

This example illustrates a continuous process for preparing amylose derivatives. An aqueous amylose slurry was continuously solubilized at 149° C. to form an 8% by weight solution, passed through a filter and then cooled to 80° C. Five normal sodium hydroxide and propylene oxide were metered into the 80° C. amylose solution at rates sufficient to furnish 4 pounds of sodium hydroxide per each 100 pounds amylose (dry solids basis) and 45 pounds of propylene oxide per each 100 pounds of amylose (dry solids basis). The reaction mixture was then passed through a vertically mounted five foot long, six inch diameter, twenty compartment, glass pipe reactor having a volume of 8.34 gallons. The average hold time in the reactor was 32 minutes. The amylose ether solution was neutralized with 5 N HCl to 6.5 pH, dried in a spray dryer and then extracted with acetone. Approximately 10 pounds of white hydroxypropyl amylose having an M.S. of 0.33 was prepared per hour.

Essentially the same results were obtained using sufficient sodium hydroxide to furnish respectively 1 pound, 2 pounds and 3 pounds per each 100 pounds of amylose with essentially the same results. Approximately 20 pounds of hydroxypropyl amylose per hour is produced by increasing the concentration of the hot amylose solution to 16% by weight. Essentially the same results are obtained by replacing the propylene oxide with ethylene oxide, acrylonitrile, etc.

Example X

This example illustrates the preparation of a hydroxyethyl ether of a high-amylose corn starch. A 16% by weight aqueous slurry of high-amylose corn starch containing approximately 54% amylose (adjusted to pH 7) was solubilized in the jet cooker in the manner described in Example I. The sample was poured into a heated autoclave (immersed in a bath at a temperature of 85° C.). Nitrogen gas was bubbled through the inlet tube to provide agitation and an inert atmosphere while sufficient sodium hydroxide to provide 0.08 mole per each mole of high-amylose corn starch was added. The autoclave was closed and 0.24 mole of ethylene oxide was added per each mole of high-amylose corn starch. After one hour the autoclave was vented with nitrogen and the reaction product neutralized prior to drum drying. The resultant product had an M.S. of 0.17.

Since many embodiments of this invention may be made and since many changes may be made in the embodiments described, the foregoing is to be interpreted as illustrative only, and our invention is defined by the claims appended hereafter.

I claim:
1. A process of preparing amylose ethers having a low level of salt contamination, which comprises the steps of dissolving amylose in water at a temperature in excess of 125° C. to form an aqueous solution of amylose consisting essentially of from about 2 to 30 parts by weight amylose and from about 98 to 70 parts by weight water, and reacting said amylose with an etherifying agent in the presence of 0.01 to 0.25 mole of alkaline catalyst per more of amylose, wherein the reaction is initiated at a temperature above the gelation temperature of the aqueous alkaline amylose solution.

2. The process of claim 1, wherein the etherifying agent is an alkylene oxide.

3. The process of claim 2, wherein the alkylene oxide is ethylene oxide.

4. The proces of claim 2, wherein the alkylene oxide is propylene oxide.

5. The process of claim 2, wherein the alkylene oxide is butylene oxide.

6. The process of claim. 2, wherein the alkylene oxide is styrene oxide.

7. The process of claim 1, wherein the etherifying agent is an alpha, beta-ethylenically unsaturated Michael's addition reagent.

8. The process of claim 7, wherein the alpha, beta-ethylenically unsaturated Michael's addition reagent is acrylonitrile.

9. The process of claim 1, wherein the alkaline catalyst is an alkali metal hydroxide.

10. The process of claim 1, wherein the alkaline catalyst is an alkaline earth metal hydroxide.

11. The process of claim 10, wherein the catalyst is neutralized with a member selected from the group consisting of sulfuric acid and carbon dioxide and water-insoluble material is removed by partitioning.

12. A process of preparing amylose ethers having a low level of salt contamination, which comprises the steps of providing an aqueous solution of amylose consisting essentially of from about 2 to 30 parts by weight amylose and from about 98 to 70 parts by weight water, and reacting said amylose with an etherifying agent in the presence of from 0.01 to 0.25 mole of alkaline catalyst per mole of amylose, wherein the reaction is initiated at a temperature above the gelation temperature of the aqueous alkaline amylose solution.

13. The process of claim 12, wherein the aqueous solution of amylose contains at least 7.5% by weight amylose and the etherification reaction is initiated at a temperature in excess of 55° C.

14. A process of preparing amylose ethers, which comprises the steps of continuously bringing together in a reaction zone at predetermined rates water, amylose dissolved in said water, etherifying agent and alkaline catalyst, wherein said amylose solution consists essentially of from about 2 to 30 parts by weight of amylose and about 98 to 70 parts by weight of water and wherein the concentration of said alkaline catalyst is maintained at a level in said reaction zone insufficient to dissolve amylose in water at room temperature initiating the reaction of said dissolved amylose and said etherifying agent at a temperature above the gelation temperature of the aqueous alkaline amylose solution, continuously reacting said dissolved amylose and said etherifying agent, and then dewatering the resultant amylose ether.

References Cited

UNITED STATES PATENTS 3,208,998   9/1965   Fisher et al. _____ 260—233.3

FOREIGN PATENTS 869,192   5/1961   Great Britain.

OTHER REFERENCES

"Potential Industrial Use of Amylose," Cereal Science Today, vol. 3, No. 8, pp. 206–209 (1958).

DONALD E. CZAJA, Primary Examiner

MELVYN I. MARQUIS, Assistant Examiner

UNITED STATES PATENT OFFICE
CERTIFICATE OF CORRECTION

Patent No. 3,542,763            Dated November 24, 1970

Inventor(s) Reedus R. Estes

It is certified that error appears in the above-identified patent and that said Letters Patent are hereby corrected as shown below:

Column 3, line 41, first occurrence, for "cyaneothyl" read ---cyanoethyl--
Column 3, line 71, for "from 98 to 70" read ---from about 98 to 70---.
Column 4, line 33, for "a 15% weight...gets" read ---a 15% by weight...ge
Column 4, line 49, for "dimenthyl" read ---dimethyl---. Column 5, line 1
for "sudfate" read ---sulfate---. Column 5, lines 2 & 3, for "amylose,"
read ---amylose.---. Column 5, line 62, for "0.2" read ---0.02---. Colu
line 8, for "preferably" read ---preferable---. Column 6, line 19, for
"preferably" read ---preferable---. Column 6, lines 42 & 43, for "amylos
read ---amylose---. Column 6, line 58, for "tempearture" read ---tempera
Column 6, line 61, for "preferably" read ---preferable---. Column 7, lir
for "edd" read ---add---. Column 7, line 19, for "therification" read
---etherification---. Column 7, line 22, for "bemade" read ---be made---
Column 7, line 30, for "limited" read ---initiated---. Column 7, lines
36 & 37, for "reaction 7.5%" read ---reaction of 7.5%---. Column 8, line
for "prepaartion" read ---preparation---. Column 9, line 47, for "concer
tion" read ---concentration---. Column 9, line 50, for "mehod" read
---method---. Column 10, line 6, for "wtih" read ---with---. Column 10,
line 33, for "end" read ---and---. Column 11, line 6, for "over" read
---oven---. Column 11, line 75, for "strength of" read ---strength at---
Column 12, Heading of Column 7, Table VIII, for "Hours Reached" read ---H
Reacted---. Column 13, line 58, for "more" read ---mole---. Column 14
claim 14, line 44, after "temperature" insert -- , --.

Signed and sealed this 13th day of April 1971.

(SEAL)
Attest:

EDWARD M. FLETCHER, JR.            WILLIAM E. SCHUYLER,
Attesting Officer                   Commissioner of Pate